INVENTOR
Michael Emmerich

BY Diggins & LeBlanc
ATTORNEYS

May 21, 1963 M. EMMERICH 3,090,083
WINDOW STRUCTURE
Filed July 27, 1959 6 Sheets-Sheet 2

INVENTOR
Michael Emmerich

BY Diggins & LeBlanc
ATTORNEYS

May 21, 1963 M. EMMERICH 3,090,083
WINDOW STRUCTURE
Filed July 27, 1959 6 Sheets-Sheet 3

INVENTOR
*Michael Emmerich*

BY *Diggins & LeBlanc*
ATTORNEYS

May 21, 1963 M. EMMERICH 3,090,083
WINDOW STRUCTURE
Filed July 27, 1959 6 Sheets-Sheet 4

INVENTOR
Michael Emmerich

BY Diggins & LeBlanc
ATTORNEYS

May 21, 1963 M. EMMERICH 3,090,083
WINDOW STRUCTURE
Filed July 27, 1959 6 Sheets-Sheet 5

INVENTOR
Michael Emmerich

BY Diggins & LeBlanc
ATTORNEYS

May 21, 1963 M. EMMERICH 3,090,083
WINDOW STRUCTURE
Filed July 27, 1959 6 Sheets-Sheet 6

INVENTOR
*Michael Emmerich*

BY *Diggins & LeBlanc*
ATTORNEYS

United States Patent Office 3,090,083
Patented May 21, 1963

3,090,083
WINDOW STRUCTURE
Michael Emmerich, Bergheim (Sieg), Germany
Filed July 27, 1959, Ser. No. 829,716
3 Claims. (Cl. 20—11)

This invention is concerned with an improved window construction and more particularly relates to window supporting members including window sashes, window frames and cross pieces such as mullions and transoms covered by a resilient anti-corrosive sleeve.

Although it is known to form window structure support members from a core element surrounded by a sleeve of plastic material, the present invention provides a novel structure of this type substantially improving over known constructions in terms of economy, ease of assembly and versatility to mention only a few. A major feature of the present invention is the provision of window structures formed from rigid cores surrounded by an anti-corrosive covering or sleeve wherein the covering itself forms the sole means for securely fixing the covering sleeve or sleeve sections about the core.

It is therefore one object of the present invention to provide a novel structural element for use as a support member in a window structure.

Another object of the present invention is to provide a novel window structure.

Another object of the present invention is to provide an improved window structure wherein the window support elements comprise a rigid core covered by an anti-corrosive resilient sleeve.

Another object of the present invention is to provide a novel window construction wherein the window structure support members include rigid cores covered by resilient sleeves which sleeves carry the sole means for locking themselves about the cores.

These and other objects and advantages of the invention will be more apparent upon reference to the following specification, claims and appended drawings where:

Figure 10:
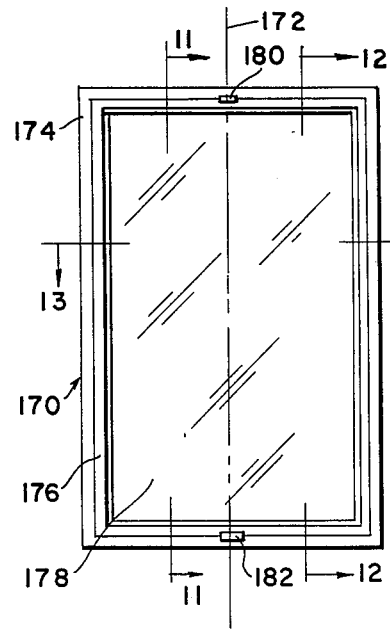
FIGURE 10 is an elevational view of still another modified embodiment of the window of the present invention.
Figures 11, 12:
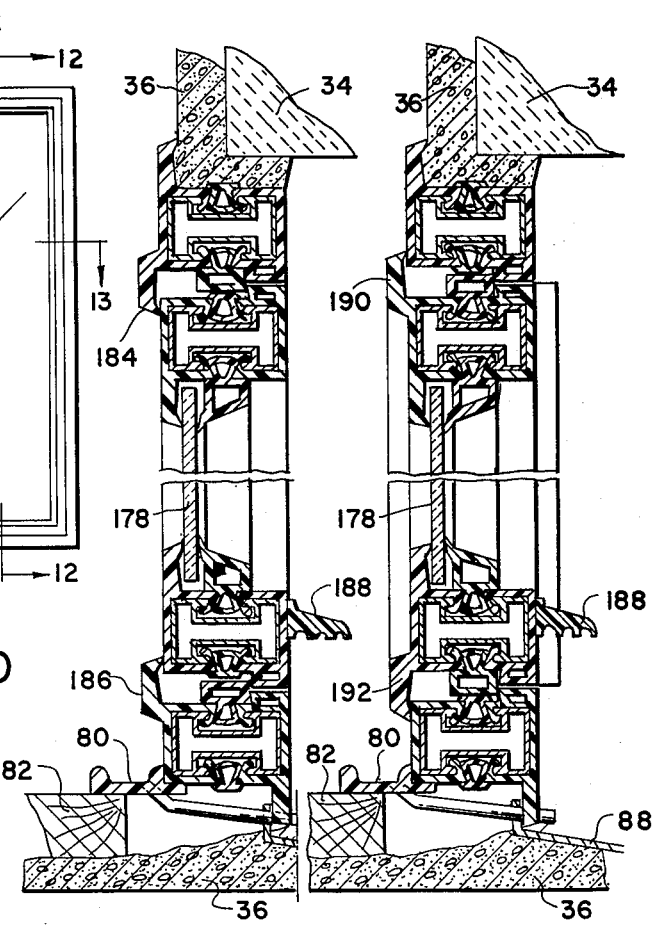
Figure 13:
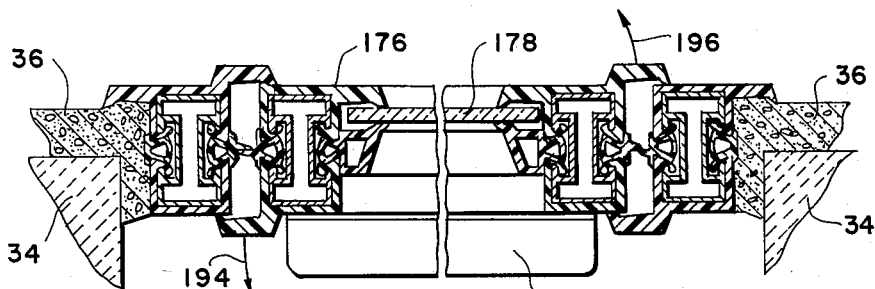
Figure 14:
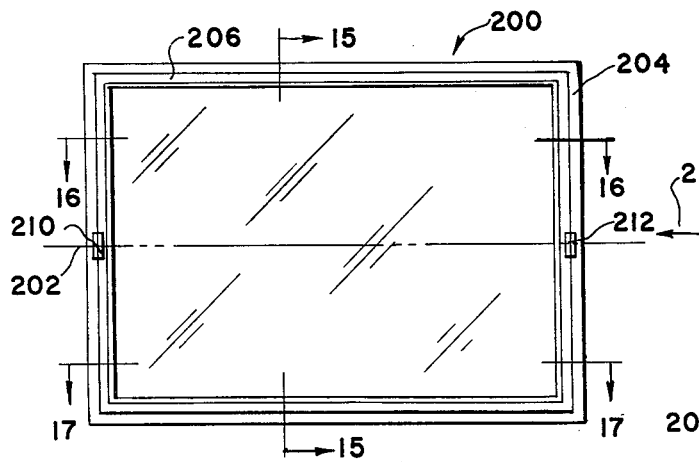
Figure 15:
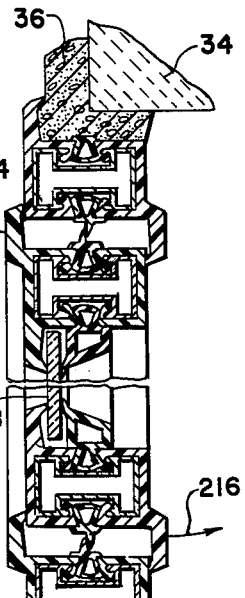
Figure 16:
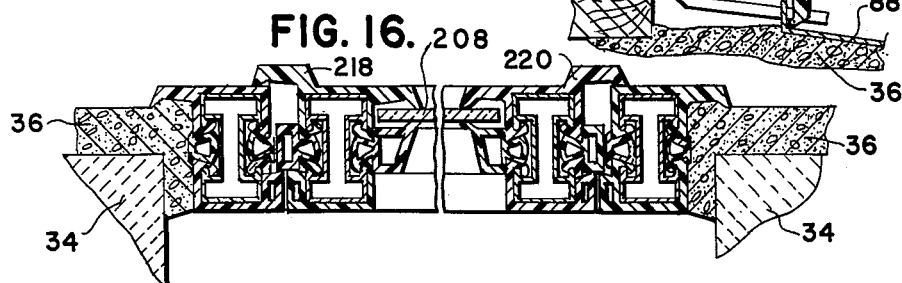
Figure 17:
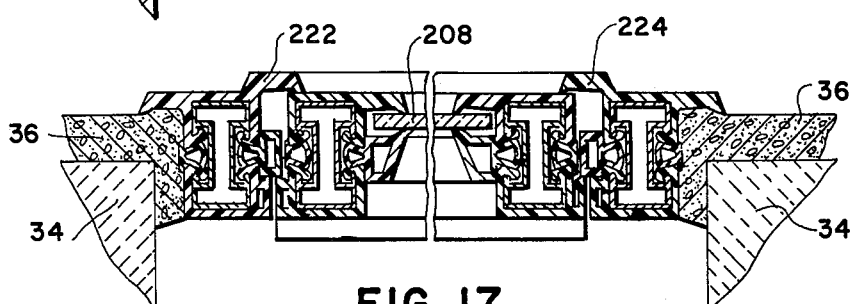
Figure 18:
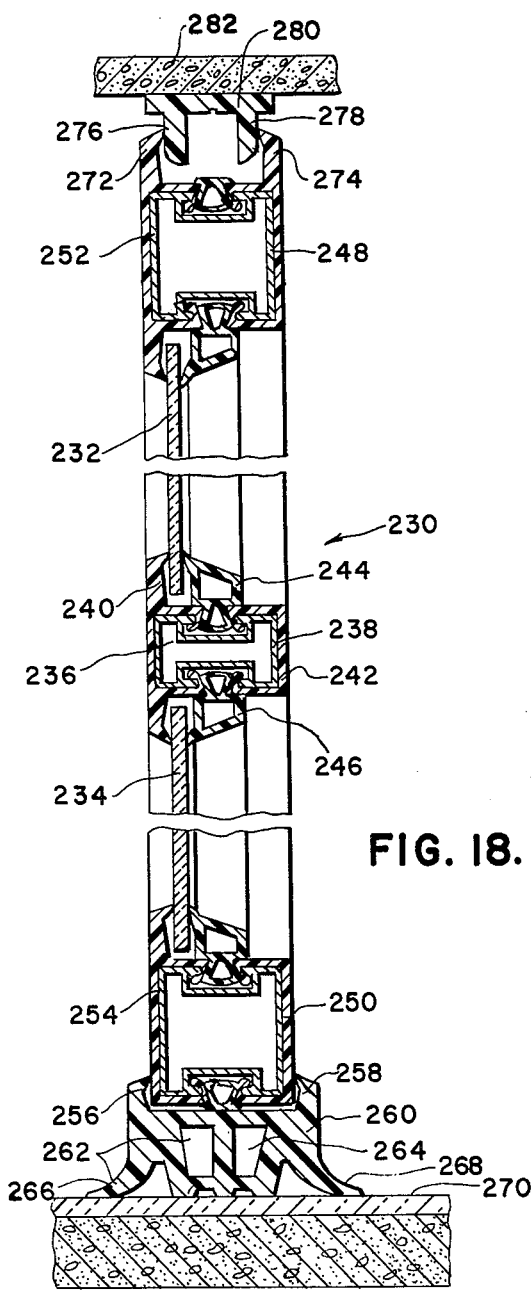

FIGURES 11 and 12 are vertical cross sections taken along the lines 11—11 and 12—12 respectively of FIGURE 10;

FIGURE 13 is a horizontal cross section taken along the line 13—13 of FIGURE 10;

FIGURE 14 is an elevational view of a still further modified embodiment of the window of the present invention;

FIGURE 15 is a vertical cross section taken along line 15-15 of FIGURE 14;

FIGURES 16 and 17 are horizontal cross sections taken along the lines 16—16 and 17—17 respectively of FIGURE 14; and FIGURE 18 is a vertical cross section through yet another modified embodiment of the window of the present invention forming a removable dividing partition primarily for indoor use.

Figure 1:
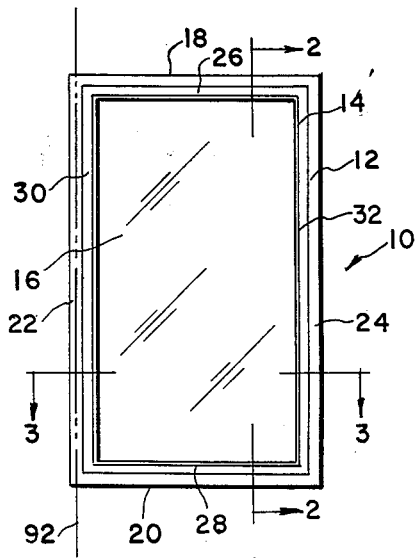
FIGURE 1 is an elevational view of a window constructed in accordance with the present invention.
Figure 2:
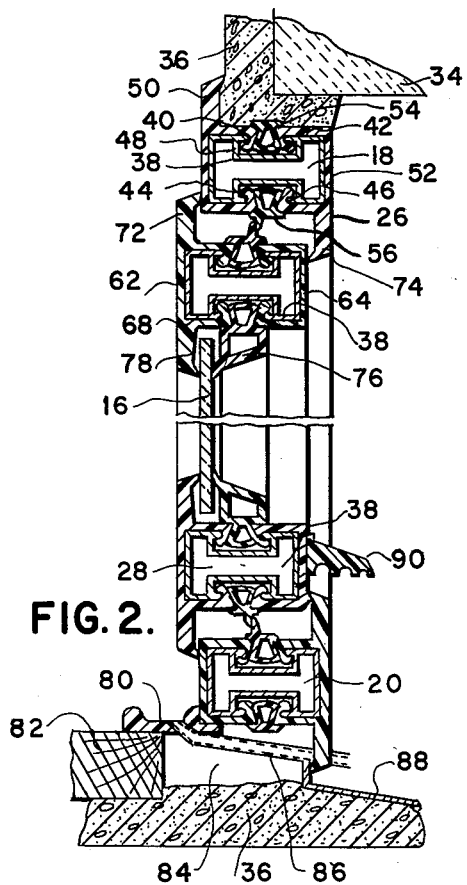
FIGURE 2 is a vertical cross section taken along the line 2—2 of FIGURE 1.
Figure 3:
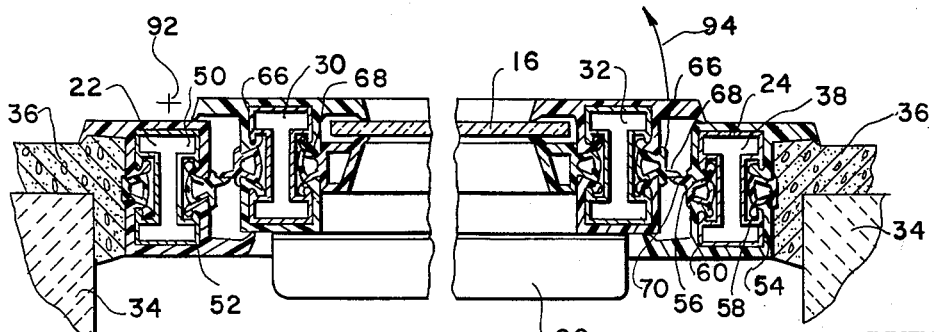
FIGURE 3 is a horizontal cross section taken along the line 3—3 of FIGURE 1.

Referring to the drawings and more particularly to FIGURES 1 through 3, there is shown the window of the present invention generally indicated at 10 comprising a window frame 12 and window sash 14, and a window pane 16. The window frame 12 is made up of a pair of upper and lower horizontal members 18 and 20 and a pair of left and right vertical members 22 and 24. The inner frame member or sash 14 is similarly made up of a pair of upper and lower horizontal members 26 and 28 and a left and right hand pair of vertical members 30 and 32. As best seen in FIGURES 2 and 3, the entire window structure is received in a suitable opening provided in the brick-work of the supporting structure such as a house or large building generally indicated at 34 and within a suitable masonry frame work indicated at 36.

Each of the component members making up the window frame and window sash comprises a central rigid core in the form of a hollow metallic member 38 generally resembling the shape of an I-beam in cross section. As clearly shown in FIGURES 2 and 3, each of the core sections 38 are formed with overhangs or ledges indicated at 40, 42, 44 and 46 for engaging the turn-over ends 48 of two sections of a covering sleeve or sheath labeled 50 and 52 in FIGURE 2. Received within the area formed by ledges 40 and 42 on the upper side of core member 38 and ledges 44 and 46 along the underside of core member 38 are a pair of beading strips 54 and 56. Sheath sections 50 and 52 are made from semi-rigid resilient material as are bead strips 54 and 56 and preferably are made from a suitable resilient synthetic plastic having anti-corrosive properties for protecting the metallic core members 38 from the elements. By way of example only the material used may be polyvinyl chloride but it will be apparent that rubber and other plastics may also be used if desired. The bead strips 52 and 54 are hollowed out along their central axis as indicated at 58 and 60 in FIGURE 3 to reduce the amount of material required and to add to the resiliency of the bead strips.

Similar resilient sheath sections 62 and 64 enveloped the cores 38 of the respective sash members 26, 28, 30 and 32. Likewise, similar beading strips 66 and 68 serve to resiliently lock the sheath sections 62 and 64 in place about the cores 38.

As best seen in FIGURE 3, the beading strips 56 and 66 include cooperating flanges 68 and 70 which engage in sealing relationship when the sash member and its accompanying window pane 16 is received in the closed position within window frame 12. Similarly, sheath section or half 62 includes an upwardly extending resilient flange which sealingly engages the sheath about frame 12 when the window is closed as indicated at 72 in FIGURE 2 while the sheath half 52 includes a downwardly extending resilient flange 74 which similarly engages the resilient sheath about sash 14 in sealing engagement when the window is closed. The innermost beading strip 68 includes an inwardly extending resilient hollow flange 76 which cooperates with a flange 78 on the sheath section 62 surrounding a portion of the window sash 14 to securely hold and retain in position the edges of the windowpane 16.

While the invention is described in conjunction with the use of transparent windowpanes, it is apparent that the invention is equally suited to other types of panels either transparent, translucent or opaque and made of material other than the glass indicated.

As best seen in FIGURES 2 and 3, the lower member 20 of the window frame 12 is in abutment with a plastic sealing strip 80 mounted over the masonry framework 36 and a portion of an inside wooden window sill 82. A portion of the masonry framework is shown broken away at 84 to illustrate a water drain 86 passing outwardly from strip 80 through masonry framework 36 to the outside of the window. Any water collected in the space between the window sash and window frame falls into the drain formed by sealing strip 80 and may pass through a suitable removable closure member if desired into the drain pipe 86 and outwardly through a masonry framework 36 to impinge upon an outer metallic window sill 88 received in the masonry framework 36. If desired, a suitable plastic weather strip 90 may be secured along the outer edge of lower sash member 28 to prevent any rain water or the like from entering the space between the window sash and window frame.

The window illustrated in FIGURE 1 is constructed to pivot about an axis indicated at 92 in FIGURES 1 and 3 of the drawing. The window is adapted to swing inwardly as indicated by the arrow showing inward motion at 94 in FIGURE 3. The windowpane and supporting window sash may be suitably supported for such pivotable movement by any conventional hinge and actuator arrangement and by way of example only may be actuated in a manner similar to that described in U.S. Patent 2,753,603.

The resilient covering sections are completely interchangeable in this and the other embodiments of the invention. Furthermore by reversing the positions of the resilient flanges such as are indicated at 76 and 78 in FIGURE 2 it is possible to retain the windowpane 16 adjacent the outer edge of the window frame and sash rather than near the inner edges as shown in the drawings.

Figure 4:
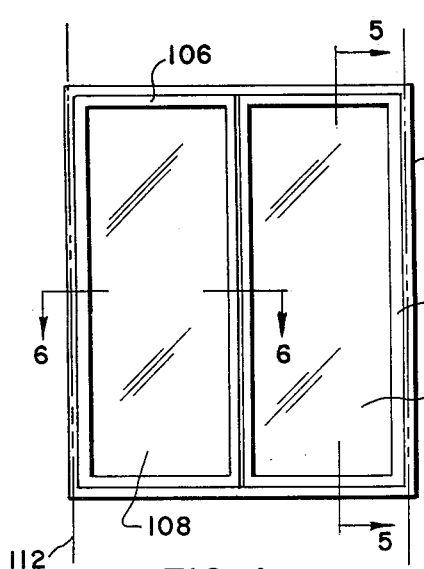
FIGURE 4 is an elevational view of a modified embodiment of the window of the present invention.
Figure 5:
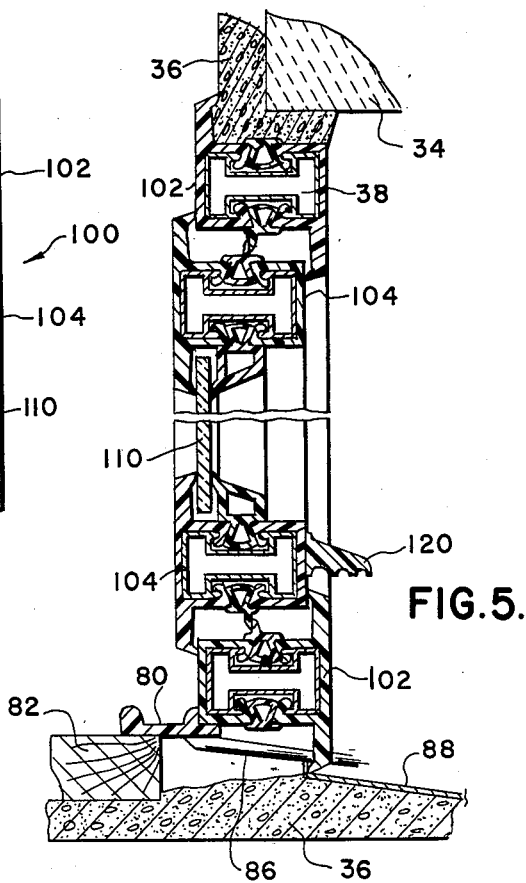
FIGURE 5 is a vertical cross section taken along line 5—5 of FIGURE 4.
Figure 6:
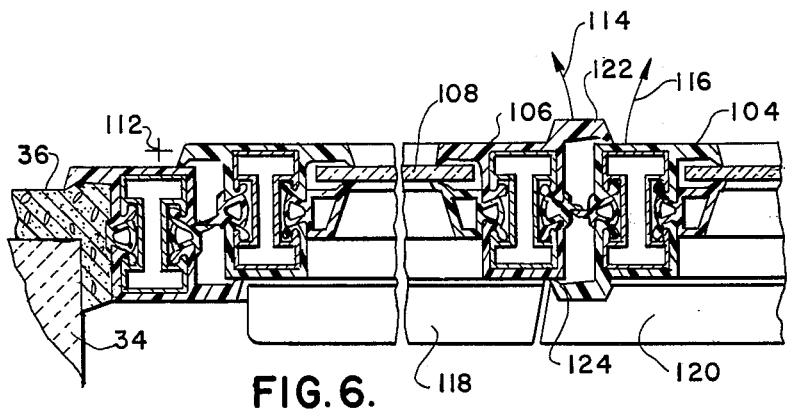
FIGURE 6 is a horizontal cross section taken along line 6—6 of FIGURE 4.

FIGURES 4 through 6 show the construction of a modified embodiment of the window of the present invention with like parts bearing like reference numerals. As can be seen, this modification is in most respects similar to the window shown in FIGURES 1 through 3 with the major exception being that the window is constructed as a double window pivoted about an axis adjacent each vertical edge. The modified window as generally indicated at 100 comprises an outer window support member or frame 102 enclosing a pair of window sashes 104 and 106. Received within window sash 104 is a windowpane 110 and within sash 106 a windowpane 108. Similar synthetic resilient plastic sheaths cover the core members 28 of the window structure shown in FIGURES 4 through 6 and the double windows of this embodiment each individually operate in a manner similar to the single window shown in FIGURES 1 through 3. For example, as clearly seen in FIGURES 4 and 6, window sash 106 carrying windowpane 108 is supported to pivot about an axis indicated at 112 in the direction of the arrow 114. Window sash 104 is similarly supported and pivoted in the direction indicated by the arrow 116 in FIGURE 6. In this embodiment, the window sashes carry a pair of protective strips 118 and 120 in all respects corresponding to the rain strip 90 previously described. In closing, the flange 122 formed on the resilient covering sheath about sash 106 engages the outer edge of the sash 104 in sealing relation and flange 124 on sash 104 engages the inner edge of sash 106 in a similar sealing relationship.

Figure 7:
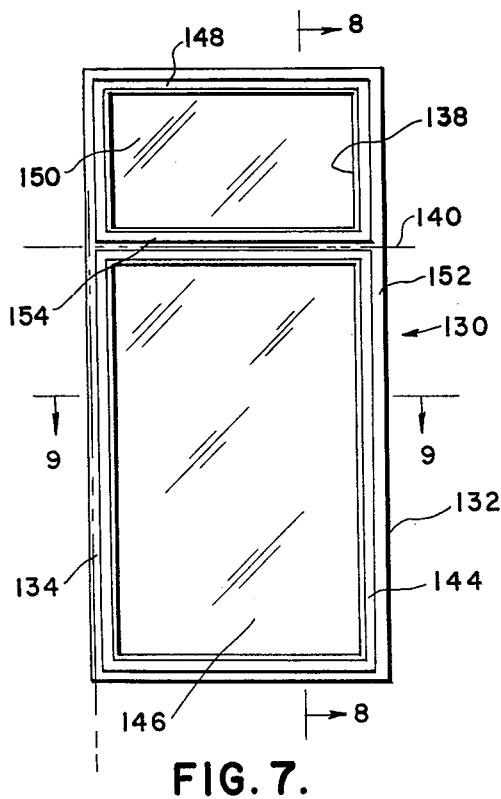
FIGURE 7 is an elevational view of a further modified embodiment of the window of the present invention.
Figure 8:
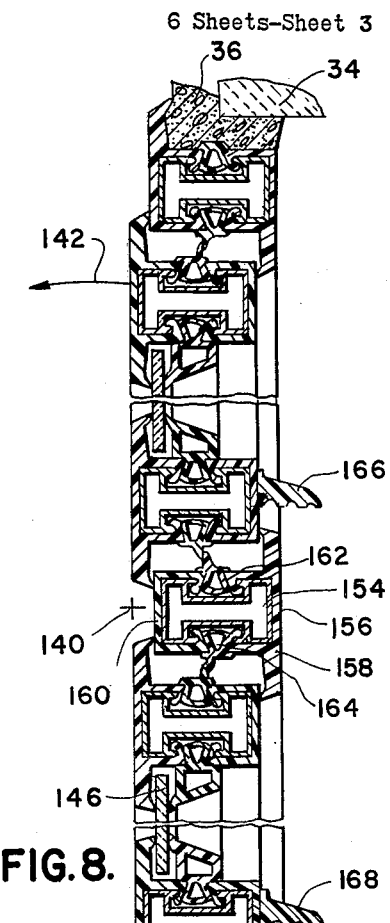
FIGURE 8 is a vertical cross section taken along line 8—8 of FIGURE 7.
Figure 9:
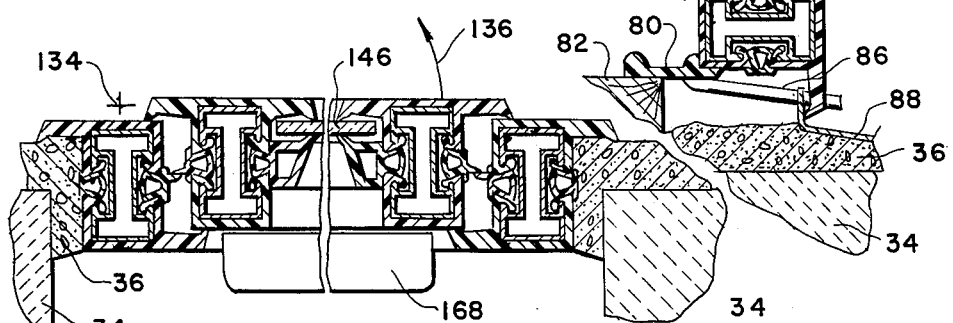
FIGURE 9 is a horizontal cross section taken along line 9—9 of FIGURE 7.

FIGURES 7 through 9 show another modification of the window of the present invention also with like elements bearing like reference numerals. In these figures the window generally indicated at 130 includes a lower window structure 132 of the type similar to that shown in the previous figures of the drawing pivoted to open about a vertical axis indicated by dotted lines at 134 in the direction indicated by the arrow at 136 in FIGURE 9. Above window structure 132, is a transom window 138 pivoted to open about a lower horizontal axis indicated by the dotted line 140 in FIGURE 7. This transom window opens in the direction indicated by the arrow 142 in FIGURE 8.

Received within the sash 144 of lower window 132 is a glass pane 146 while the sash 148 of transom window 138 encloses and completely surrounds the edges of a transom windowpane 150. Surrounding both windows is a window frame 152 including a horizontal cross piece or transom bar 154 separating the two window structures. Transom bar 154 comprises a hollow core member 156 preferably of metal surrounded by resilient sheath sections 158 and 160 which in turn engage beading strips 162 and 164 on the lower sash member of the transom window 138 and the upper sash member of window 132 respectively in a manner similar to that previously described with respect to the preceding windows. Extending along the outside edge of the lower sash members of both windows, are weather strips 166 and 168 for preventing rain water from gaining access to the space between the window sashes and the window frames. In all other respects, this modification is constructed similar to those previously described.

FIGURES 10 through 13 show still another modification of the window of the present invention with the window generally indicated at 170 pivoted about a vertical axis 172 passing through the center of the window. In this embodiment, the window 170 includes a surrounding frame 174 enclosing a window sash 176. Sash 176 in turn engages the outer edges of and supports a windowpane 178. The window sash 176 as shown is pivotally supported from the frame 174 at the center of both its upper and lower ends by a pair of suitable brackets 180 and 182 connecting the window sash to the window frame.

FIGURE 11 is a vertical cross section taken along the line 11—11 of FIGURE 10 on one side of the pivot axis 172 and illustrates the window frame as incorporating upper and lower flanges 184 and 186 on the inside of the window which extend over and sealingly engage the resilient sheath covering of the upper and lower members of the window sash 176. Weather stripping 188 is incorporated as before.

FIGURE 12 is a vertical cross section taken along line 12—12 of FIGURE 10 on the other side of pivot axis 172. As can be seen in FIGURE 12, the sash member 176 incorporates upper and lower flanges 190 and 192 on the interior side of the window for sealing engagement with the inner edges of the window frame 174. The reason for this variation in construction on opposite sides of the pivot axis is clearly apparent from FIGURE 13 wherein the window sash and accompanying window pane is indicated as pivoted about a central axis so that the opposite vertical edges of the window sash move in opposite directions as indicated by the arrows at 194 and 196 in FIGURE 13.

FIGURES 14 through 17 show still another embodiment wherein a window generally indicated at 200 is mounted to pivot about a central horizontal axis indicated at 202 and includes a surrounding window frame 204, a window sash 206 and a windowpane 208. Window sash 206 is pivotally mounted on the window frame 204 by means of left and right hand brackets 210 and 212 respectively.

FIGURE 15 is a vertical section taken along line 15—15 of FIGURE 14 and illustrates the window as pivoted about a central horizontal axis. The diagonally opposite edges of the window sash 206, that is extreme top and bottom edges, are adapted to move in opposite directions as indicated by the arrows at 214 and 216 in FIGURE 15.

FIGURE 16 is a horizontal cross section taken along line 16—16 of FIGURE 14 in a horizontal plane above the center pivot line 202. As can be seen from FIGURE 16, this portion of the window sash 206 includes a pair of resilient flanges 218 and 220 overlapping the adjacent edges of the window frame. This permits the upper half of the window sash to pivot in the direction indicated at 214 in FIGURE 15.

FIGURE 17 is a horizontal cross section taken along line 17—17 in a horizontal plane below the central pivot axis 202. In FIGURE 17, it can be seen that the window frame 204 in this portion of the window structure incorporates the overlapping flanges 222 and 224 permitting outward movement of the lower half of the window sash and windowpane in the direction indicated by the arrow at 216 in FIGURE 15. In all other respects, the window of this embodiment is similar to the previously described embodiments in that the window structure members similarly incorporate resilient sleeves in interlocking arrangement about hollow metallic cores and the sleeves or sheaths cooperate with beading strips to provide the sole means for locking the resilient sheaths about the core.

FIGURE 18 shows a double pane window or separating panel for interior use generally indicated at 230 including an upper windowpane 232 and a lower windowpane 234 of similar construction. Separating the windowpane is a cross member 236 including a hollow metallic core 238 and resilient sleeve sections 240 and 242 similar to the construction described with respect to the previous window embodiments. A pair of resilient beading strips 244 and 246 cooperate with the resilient sleeve section 240 to retain the interior edges of the windowpanes 232 and 234.

The opposite edges of the windowpanes are engaged by the resilient sleeves of similar sash members 248 and 250 the construction of which except for the size of the metallic cores 252 and 254 is similar to the construction of earlier embodiments. Lower sash member 250, however, is received within the spaced resilient flanges 256 and 258 of a resilient frame member 260. Frame member 260 includes a pair of hollowed out central portions 262 and 264 providing both insulation and increased resiliency. Downwardly extending lips 266 and 268 engage the floor structure 270 in sealing relationship.

The upper sash member 248 includes a pair of spaced resilient flanges 272 and 274 which surround and sealingly engage the legs 276 and 278 of a like bracket 280 suitably mounted on or secured to the opposite support 282.

It is apparent from the construction shown in FIGURE 18 that this window is stationary and does not pivot to open and close about any axis. However, the window may be removed from the frame structure by inserting a downward or inward pressure on resilient member 260 as the case may be to press this member against support 270 a sufficient distance to allow the flanges 272 and 274 on upper sash 248 to clear the downwardly extending legs 276 and 278 of the frame bracket 280. Once the flanges 272 and 274 clear these legs, the entire double window unit is free to pivot and may be removed from its support.

As can be seen, the present invention provides a novel window construction of rugged design and extreme flexibility. The window may be made in a wide variety of shapes and forms and may be pivoted about a different axis in any of the well-known manners. A primary feature of the present invention is the incorporation of split resilient sleeves for surrounding rigid core members preferably formed as hollow metallic I-beams which resilient covering may by their resilient nature be interlocked in cooperation with suitable resilient beading strips about the hollow cores to provide protection against the elements for the core members. The resilient sleeves are preferably made of an anti-corrosive resilient plastic but may be made of rubber, neoprene or other resilient materials having varying degrees of resistance to the elements as required for the particular use.

This application is a continuation-in-part of copending application Serial No. 753,495, filed August 6, 1958, now Patent No. 3,012,642, issued December 12, 1961.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A window element comprising a rigid hollow core and a covering about the periphery of said core, said covering comprising at least two separate sections of polyvinyl chloride resilient material, said sections resiliently gripping said core for maintaining said sections on the periphery of said core, said core having a substantially I-shaped cross section and including flanges extending parallel to the web of said I-shape, said flanges defining channels along opposite edges of said core.

2. A window element according to claim 1 wherein the edges of said sections are received in said channels and are resiliently locked over the ends of said flanges.

3. A window element according to claim 2 including resilient beading strips received in said channels and resiliently engaging the edges of said cover sections.

References Cited in the file of this patent

UNITED STATES PATENTS

| 639,106 | Soper | Dec. 12, 1899 |
| 670,939 | Rapp | Apr. 2, 1901 |
| 1,832,847 | Lane | Nov. 24, 1931 |
| 2,782,887 | Zimmerman | Feb. 26, 1957 |

FOREIGN PATENTS

| 304,908 | Great Britain | Jan. 31, 1929 |
| 498,782 | Germany | May 30, 1930 |
| 105,545 | Sweden | Sept. 22, 1942 |
| 660,242 | Great Britain | Oct. 31, 1951 |
| 779,278 | Great Britain | July 17, 1957 |